United States Patent
Parlog, III et al.

[11] Patent Number: 6,151,294
[45] Date of Patent: *Nov. 21, 2000

[54] WRITE PROTECT COMPONENT FOR RE-WRITABLE COMPACT DISC

[76] Inventors: John Parlog, III, 1331 Hampton Ct., Byron, Calif. 94514; Anthony Wade Wilson, 1355 Bird Ave., San Jose, Calif. 95125

[*] Notice: This patent issued on a continued prosecution application filed under 37 CFR 1.53(d), and is subject to the twenty year patent term provisions of 35 U.S.C. 154(a)(2).

[21] Appl. No.: 08/928,046

[22] Filed: Sep. 11, 1997

Related U.S. Application Data

[60] Provisional application No. 60/057,676, Aug. 27, 1997.

[51] Int. Cl.[7] .......................................................... G11B 3/70
[52] U.S. Cl. ............................................. 369/289; 369/290
[58] Field of Search .......................... 283/81; 369/275.2, 369/275.5, 282, 289, 290, 291, 283, 284, 286, 292; 428/40.1, 42, 488.4

[56] References Cited

U.S. PATENT DOCUMENTS

| | | | |
|---|---|---|---|
| 4,032,679 | 6/1977 | Aoyagi | 428/42 |
| 4,879,710 | 11/1989 | Iijima | 369/291 |
| 4,973,088 | 11/1990 | Levy | 283/81 |
| 4,983,437 | 1/1991 | Merrick | 428/40 |
| 5,020,048 | 5/1991 | Arai et al. | 369/291 |
| 5,482,779 | 1/1996 | Bausewein et al. | 428/488.4 |
| 5,543,001 | 8/1996 | Casillo et al. | 156/60 |
| 5,732,979 | 3/1998 | Finke et al. | 283/81 |
| 5,757,765 | 5/1998 | Chen | 369/291 |
| 5,770,288 | 6/1998 | Carney, Jr. | 428/40.1 |
| 5,770,289 | 6/1998 | Tracy | 428/40.1 |

FOREIGN PATENT DOCUMENTS

| | | |
|---|---|---|
| 01059665 | 3/1989 | Japan . |
| 04095287 | 3/1992 | Japan . |
| 09120621 | 5/1997 | Japan . |

*Primary Examiner*—David L. Ometz
*Assistant Examiner*—Angel Castro
*Attorney, Agent, or Firm*—Sonnenschein Nath & Rosenthal; Jennifer H. Hammond

[57] ABSTRACT

A write-protect component for re-writable CD's comprising (a) an annular ring, (b) an adhesive to secure the annular ring to the re-writable CD, and (c) an at least partly removable liner to substantially cover the adhesive.

10 Claims, 3 Drawing Sheets

WRITE PROTECT COMPONENT FOR RE-WRITABLE COMPACT DISC

This application claims priority of provisional application No. 06/057,676 filed Aug. 27, 1997.

BACKGROUND OF THE INVENTION

As computer programs and data files have become larger and larger, and take up more and more space on portable data storage devices (such as floppy disks), it has become increasingly common to store these programs and files on compact disks ("CD's"). While early CD's did have the advantage of being able to store very large amounts of data, they suffered from the disadvantage that it was not possible for the consumer to record his or her own data on the CD. Thus, only pre-recorded CD's were available. Recently, however, "re-writable" CD's have started to become available. The consumer can record data on these CD's and, when desired, can erase that data and/or record new data over the old. Re-writable CD's, therefore, are much like traditional floppy disks, except that they can store much greater quantities of information.

One concern with re-writable CD's is that there be a means by which accidental erasure of recorded information can be avoided. Floppy disks solve this problem by providing a movable tab which, when it is in one position, prevents additional information from being recorded on the disk and prevents erasure of any information from the disk. One means by which this can be accomplished on a re-writable CD is by covering the File Allocation Table (FAT) section of the CD.

A good write-protect component must be both inexpensive to manufacture and easily removable from the CD so that, if desired, a previously write-protected disk can be recorded on again.

SUMMARY OF THE INVENTION

In order to solve these problems, the present invention provides for a re-writable CD write-protect component comprising (a) an annular ring, (b) an adhesive to secure the annular ring to the re-writable CD, and (c) an at least partly removable liner to substantially cover the adhesive.

DETAILED DESCRIPTION

Figure 1:
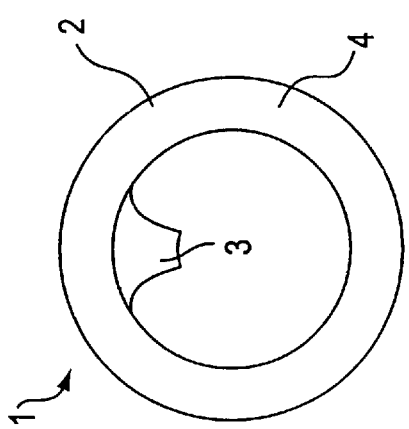
FIG. 1 is a top view of a write-protect component according to the invention.

The FAT section of a re-writable CD is generally located in a ring centered about the center of the CD and located on the data side of the CD. Therefore, as shown in FIG. 1, write-protect component 1 will have a generally annular shape represented by ring 2. Also shown in FIG. 1 is tab 3 which, as is discussed more fully below, assists in preparing write-protect component 1 for use.

Figure 3:
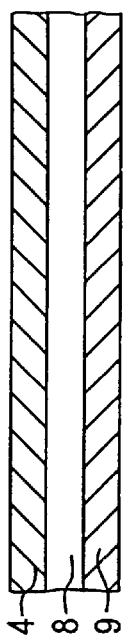
FIG. 3 is a side view, not to scale, of a write-protect component according to the invention.

Write-protect component 1 comprises three layers: (a) an annular ring, (b) an adhesive applied to one surface of the annular ring to secure the annular ring to the re-writable CD, and (c) an at least partly removable liner to substantially cover the adhesive. The arrangement of the layers may be seen in FIG. 3. The top view of write-protect component 1 shown in FIG. 1 permits only annular ring 4 to be seen. Annular ring 4 must be made of a material which is opaque. By "opaque," what is meant is that the material must prevent the hardware from accessing the FAT so as to render the CD write-protected. An additional physical requirement for the material which makes up annular ring 4 is that it be dimensionally stable over a wide temperature range of from at least −40 to +178 degrees Celsius, preferably from −40 to +70 degrees Celsius. Preferably, annular ring 4 will be made of a light and flexible material, such as a plastic or rubbery material. More preferably, it will made of either a polyester, a polyethylene, or a polypropylene. Most preferably, it will be made of a polyester.

Figure 4:
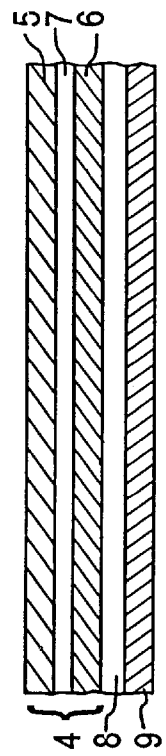
FIG. 4 is side view, not to scale, of a preferred embodiment of a write-protect component according to the invention.

In a preferred embodiment, annular ring 4 is comprised of two separate sublayers, joined together by intervening layers of pressure sensitive adhesives. This embodiment is depicted in FIG. 4, which shows annular ring 4 comprised of sublayers 5 and 6 and intermediate adhesive layer 7. If a multilayer annular ring 4 is used, at least one of the sublayers must be opaque. The sublayers can also be made of plastic or rubbery materials. The adhesive used to make intermediate adhesive layer 7 can be either water-based or acrylic-based, but preferably will be acrylic-based. The adhesive should also be of a kind which provides a strong bond which grows stronger over time, so as to prevent the two sublayers from coming apart. Suitable adhesives for intermediate adhesive layer 7 include acrylic copolymer adhesives, such as those sold by the 3M Company as the 300-series. Annular ring 4 can also be made of 3 or more sublayers, each joined by appropriate intermediate adhesive layers.

Annular ring 4, including all sublayers and intermediate adhesive layers, preferably has a thickness from about 0.001 inches to about 0.015 inches, more preferably from about 0.002 inches to about 0.008 inches, and most preferably from about 0.002 inches to about 0.005 inches.

The bottom of annular ring 4 is coated with an adhesive 8 which is used to secure removable liner 9 to annular ring 4. When write-protect component 1 is in use, adhesive 8 secures annular ring 4 to the CD. This adhesive may also be either water- or acrylic-based, but is preferably acrylic-based. Adhesive 8 will ordinarily be a pressure-sensitive adhesive which will show no tendency to increase the strength of its bond over time. Adhesive 8 should provide a secure bond between the CD and write-protect component 1. However, the bond should not be so strong that the CD will be damaged if write-protect component 1 is removed. Moreover, adhesive 8 should be selected so that when annular ring 4 is removed from the CD, no residue will be left behind which might interfere with the ability to re-record on the CD. Selection of the particular adhesive used can be readily determined based on the other materials used for the write-protect component. However, modified acrylic copolymer/resin modified adhesives, such as those sold by the 3M Company as the 550-family of adhesives, have been found to be very useful.

Figure 2:
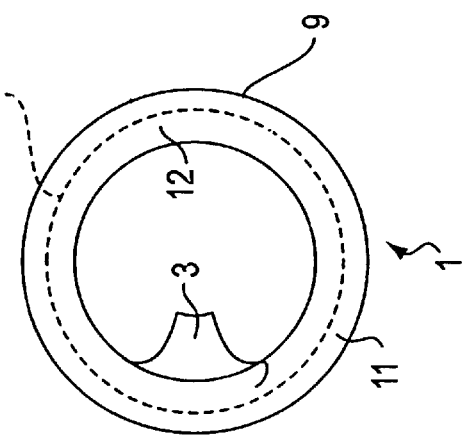
FIG. 2 is a bottom view of a write-protect component according to the invention.

FIG. 2 shows a bottom view of write-protect component 2. From the bottom, it is only possible to see removable liner 9. Removable liner 9 can include tab 3 which is used to facilitate removal of removable liner 9 from the bottom of annular ring 4. Removable liner 9 should be made of a light, thin, and flexible material. Preferably, it is made of a plastic material, such as a polyester, a polyethylene, or a polypropylene. Most preferably, it is made of a polyester. Removable liner 9 will ordinarily having a thickness ranging from about 0.0005 inches to about 0.005 inches, more preferably from 0.0005 inches to about 0.003 inches, and most preferably from about 0.001 inches to about 0.002 inches. Removable liner 9 can be any color, or it may be transparent.

Removable liner 9 can be "scored" along any particular line so that when it is removed from the bottom of annular ring 4, part of it will remain attached to annular ring 4, keeping that section of the bottom of annular ring 4 non-adhesive. Preferably, the scored line will define an annular region, as is shown in FIG. 2 (where the scored line is shown as item 10). When removable liner 9 is removed by pulling on tab 3, the adhesive on outer section 11 of the bottom of annular ring 4 remains unexposed—in effect preventing outer section 11 from adhering to the CD, while inner section 12 adhere to and secures the write-protect component to the CD. Thus, when the consumer wishes to remove write-protect component 1 from the CD, he will easily be able to lift up the its outer edge, facilitating removal of write-protect component 1. If the entire bottom surface of annular ring 4 were adhesively secured to the CD, the consumer could damage the surface of the CD while trying to pry up the edge of write-protect component 1.

The use of scored line 10 facilitates the manufacturing process because it allows adhesive 8 to be applied to the entire bottom surface of annular ring 4, rather than trying to apply it selectively to certain regions of that surface. Scored line 10 may be provided using conventional means, such as, rotary cutting, steel rule cutting, and laser cutting. Other methods of permitting facile, partial removal of removable liner 9 (such as scoring the liner or providing two separate liners) are also within the scope of this invention.

Figure 6:
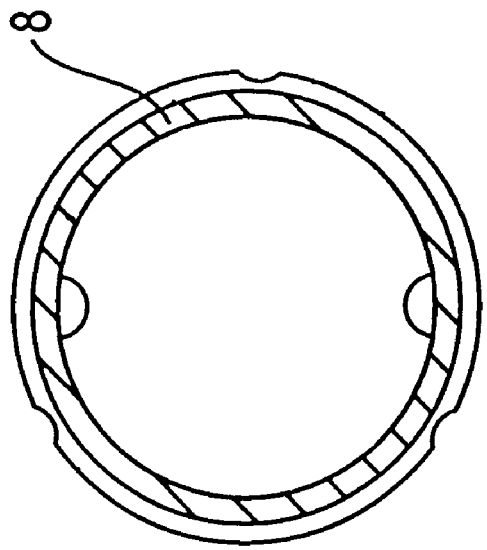
FIG. 6 is a bottom view of the same embodiment of a write-protect component according to the invention as shown in FIG. 5.
Figure 5:
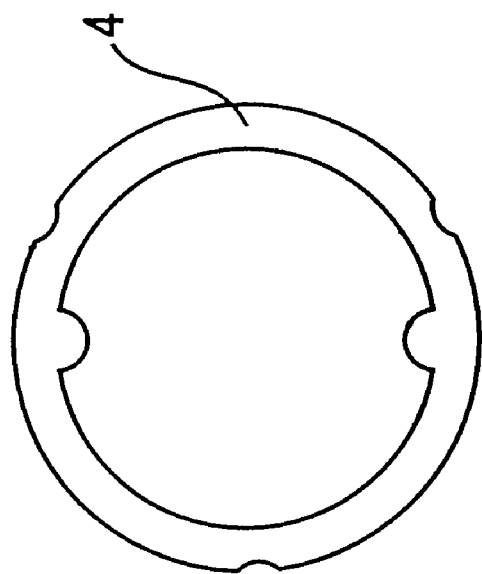
FIG. 5 is a top view of another embodiment of a write-protect component according to the invention.
Figure 7:
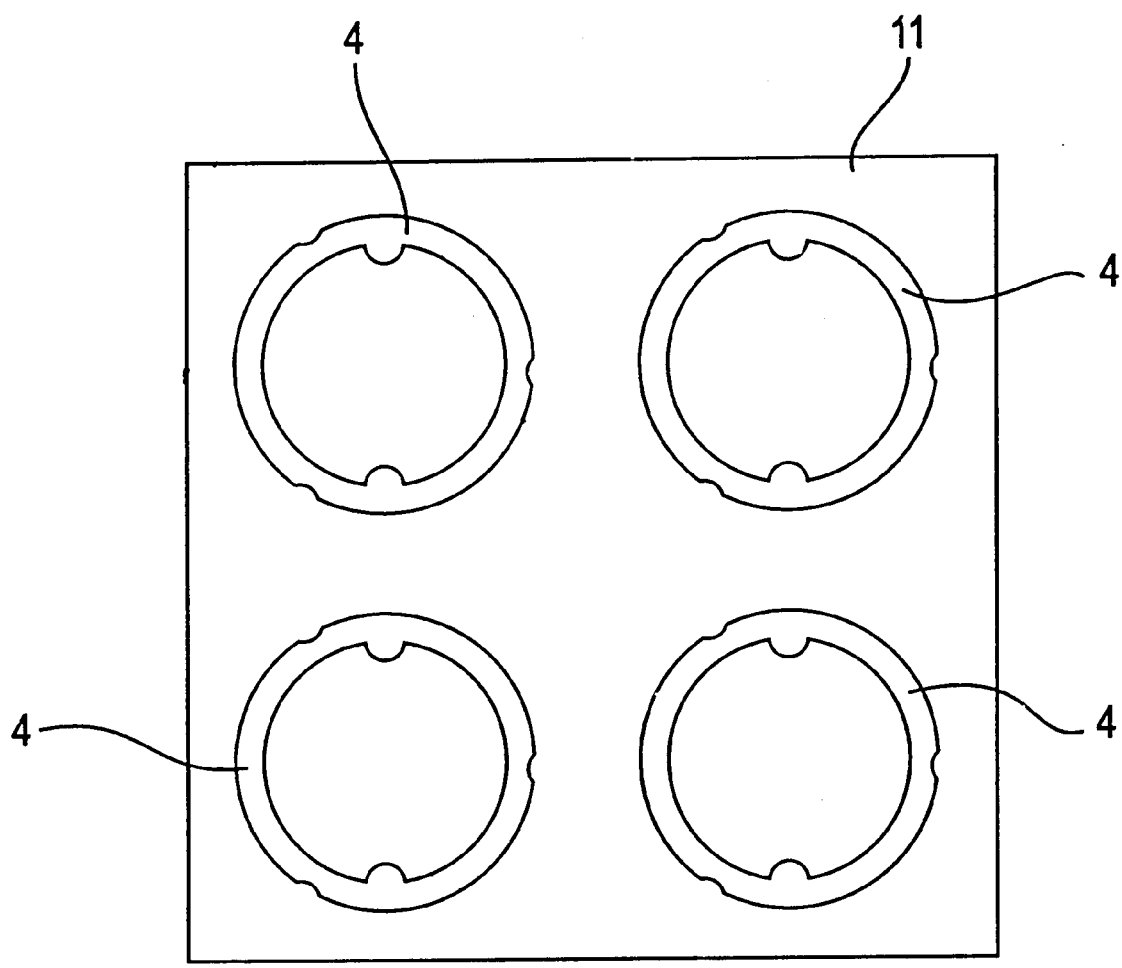
FIG. 7 is a top view of an alternative embodiment of write-protect components according to the invention.

Also within the scope of this invention is a "sheet" of write protect components, as shown in FIG. 7. In this embodiment, a series of annular rings 4 are secured by means of an adhesive layer (not shown) to a sheet liner 11. Annular rings 4 use a single opaque base material, typically 0.005 inches in thickness. The adhesive is typically a UV printable modified acrylic copolymer, water-based emulsion acrylic, or any other similar adhesive systems, and is applied only the specific adhesive area of each annular ring 4 used to bond the write-protect component to the FEAT section of the re-writable CD. This embodiment avoids the need to score the liner scoring and permits a decrease in costs as compared with more expensive protective liner materials which may used in the embodiment shown in FIGS. 1–4. Sheet liner 11 would function as a means of transport until such time as the end-user removes the write-protective component from the sheet, thereby exposing the adhesive area, and apply the device to the CD. FIG. 5 shows a top view of annular ring 4 which can be attached to sheet liner 11. FIG. 6 shows a bottom view of annular ring 4 which may be attached to sheet liner 11 by means of adhesive layer 8. FIG. 7 shows four write-protect components on a sheet, but that number can be either larger or smaller.

Removable liner 9 can either be the same shape as annular ring 4, or it can be a different shape, so long as it substantially covers adhesive 8. Preferably (except in the embodiment pictured in FIG. 7), removable liner 9 will have the same shape as annular ring 4, except for the provision of tab 3. The top surface of removable liner 9 (the surface adjacent to adhesive 8) can be coated with a lubricant, such as a silicone release agent, to facilitate its removal from the bottom of annular ring 4.

The total thickness of write-protect component 1 should be such that when applied to the CD it does not interfere with ordinary operation of the CD drive (except insofar as it performs its write-protect functions). Preferably, the total thickness will be between 0.001 inches and 0.020 inches, more preferably between 0.002 inches and 0.015 inches, and most preferably between 0.003 inches and 0.010 inches. The radius and width of write-protect component 1 will be chosen so that, when placed on the CD, it will cover only the FAT. Generally, the outer radius of the write-protect component will be approximately 1.5 inches, and it will have a width of approximately 0.33 inches.

Write protect component 1 can be manufactured using conventional means, such as, rotary press die cutting, conventional laminating and die cutting, and conventional laminating and laser cutting. The layers are generally brought together before cutting.

Alternatively, the present invention may be manufactured using a single opaque base material, typically 0.005 inches in thickness, with a single layer of pressure sensitive adhesive protected by a polyester liner, typically 0.0015 inches in thickness, which may be scored and die cut to shape.

What is claimed is:

1. A re-writable compact disk write-protect component comprising (a) an opaque annular ring, wherein the annular ring covers the File Allocation Table section of the readable side of a re-writable compact disk thus inhibiting writing to the re-writable compact disk while still permitting reading of the re-writable compact disk, (b) an adhesive located on one side of the annular ring to the File Allocation Table section of secure the annular ring to the re-writable compact disk, and (c) an at least partly removable liner to cover the adhesive.

2. The write protect component of claim 1, wherein the annular ring comprises three layers: a sublayer, an intermediate adhesive layer, and a second sublayer.

3. The write-protect component of claim 1, wherein the removable liner may be partly removed from the adhesive so that only a portion of the adhesive is exposed.

4. The write-protect component of claim 3, wherein the removable liner is scored so as to enable it to be partly removed from the adhesive.

5. The write-protect component of to claim 3, wherein the shape of one section of the partly removable liner which may be removed is annular.

6. The write-protect component of claim 5, wherein the annular shaped, removable section of the removable liner is adjacent to the inner edge of the annular ring.

7. The write-protect component of claim 1, wherein the annular ring is made of a plastic material.

8. The write-protect component of claim 7, wherein the annular ring is made of a material selected from the group consisting of polyesters, polyethylenes, and polypropylenes.

9. The write-protect component of claim 1, wherein the at least partly removable comprises a sheet on which two or more annular rings are secured by the adhesive.

10. A re-writable compact disk recited in claim 1, wherein a portion of the adhesive on the annular ring, when affixed to the File Allocation Table section of the compact disk, remains unexposed to allow the annular ring to be easily subsequently removed from the compact disk.

\* \* \* \* \*